United States Patent [19]

Jilling

[11] 3,962,671

[45] June 8, 1976

[54] CALIBRATION TRANSDUCER

[75] Inventor: Adam Jilling, Newport, R.I.

[73] Assignee: The United States of America as represented by the Secretary of the Navy, Washington, D.C.

[22] Filed: Aug. 18, 1975

[21] Appl. No.: 605,565

[52] U.S. Cl. .............................. 340/5 C; 73/1 DV; 73/1 E; 73/167
[51] Int. Cl.² ........................................ H04R 29/00
[58] Field of Search ........... 73/1 R, 1 DV, 1 E, 167, 73/432 SD; 340/5 C, 8 S, 16 R

[56] References Cited
UNITED STATES PATENTS

| | | | |
|---|---|---|---|
| 2,628,335 | 2/1953 | Drake .............................. | 73/67.7 X |
| 2,918,651 | 12/1959 | Podolak et al. .............. | 340/5 C UX |
| 3,079,583 | 2/1963 | Beitscher et al. ................... | 340/5 C |
| 3,167,150 | 1/1965 | Darby et al. ..................... | 340/5 C X |
| 3,292,142 | 12/1966 | Carson .......................... | 340/5 C UX |
| 3,683,680 | 8/1972 | Johnson et al. ...................... | 73/67.7 |
| 3,864,664 | 2/1975 | Trott et al. .......................... | 340/5 C |
| 3,913,062 | 10/1975 | Spurlock ............................. | 340/5 C |

Primary Examiner—Herbert Goldstein
Assistant Examiner—Frederick Shoon
Attorney, Agent, or Firm—Richard S. Sciascia; Arthur A. McGill; Prithvi C. Lall

[57] ABSTRACT

Valid artificial targets are generated by means of an external attachment utilizing a calibration transducer affixed against a homing system transducer within the nose section of the Torpedo Mark 48 Mod 1. The calibration transducer comprises four elements bonded to a Rho-C rubber surface with each element located in separate quadrants. A plurality of phase shifters for nulling purposes are connected between the four elements. Phase shifted signal inputs then enable the calibration transducer elements to provide acoustic signals corresponding to predetermined target angles.

3 Claims, 2 Drawing Figures

U.S. Patent  June 8, 1976  3,962,671
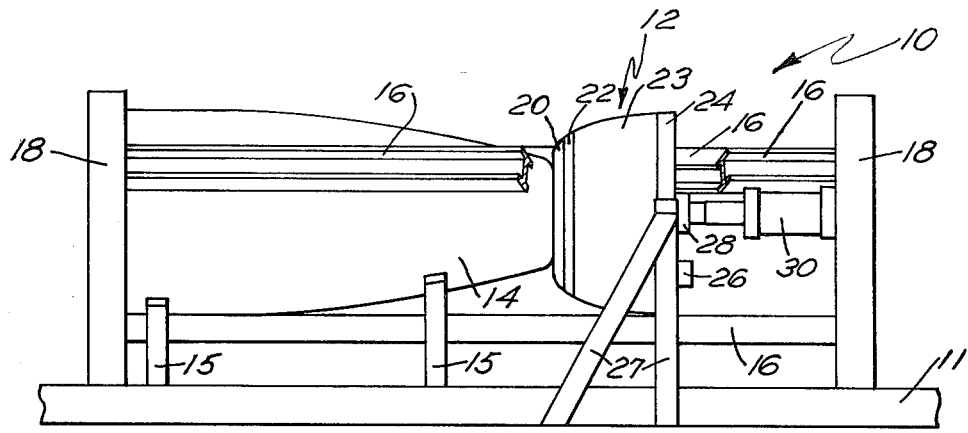
F I G. 1
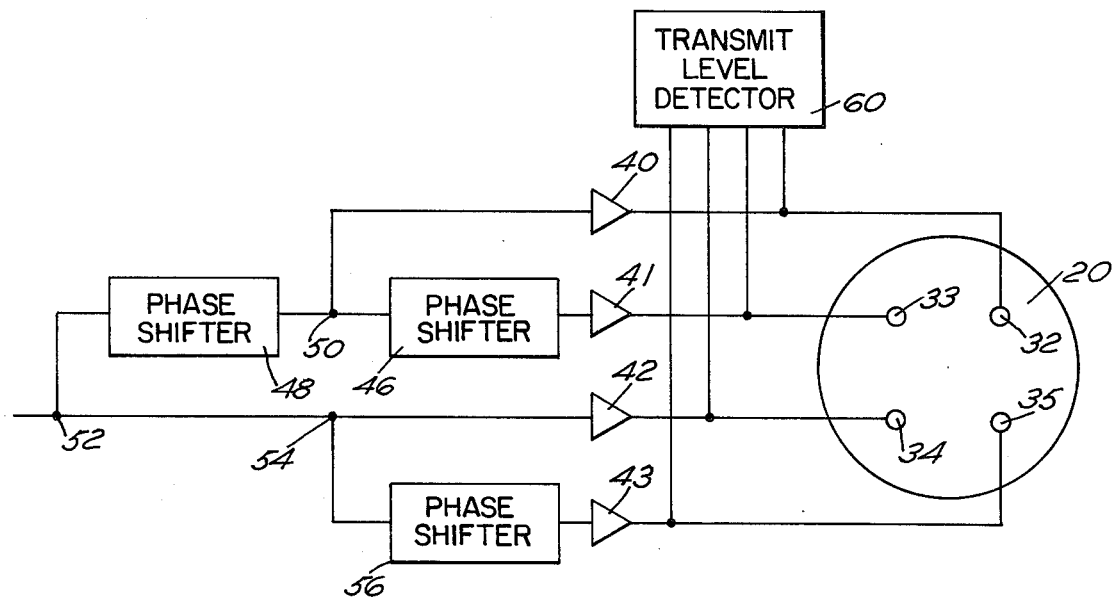
F I G. 2

3,962,671

CALIBRATION TRANSDUCER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to test equipment and more particularly to a system for exercising the transducer and acoustic panel of a homing torpedo by means of an external attachment.

Two previous known attempts have been made for generating artificial target signals in order to test homing devices. Both attempts used a device that is called either an acoustic calibration transducer or an inverse transducer. One system included the use of four spaced transducer elements mounted on a platform adapted for rotation. The platform was eccentrically offset and tilted with respect to the transducer axis. The entire assembly was immersed in a bath of oil with one side clamped to the face of the transducer. The platform was then rotated for generating varying target angles within the homing system transducer. The problem with the system included unexpected nulls and peaks due to a varying geometry in the near field causing the eventual abandonment of the effort. A second system was devised that eliminated some of the previous problems by using stationary geometry. A number of calibration elements were located at predetermined distances and directions from the transducer face. Coupling between the homing system transducer and the calibration elements was provided by a water column. Transmitting through elements in different quadrants permitted generation of up-down, left-right commands, but only at fixed angles. The detrimental effects of contamination of the transducer surfaces was minimized by circulating the water. This resulted in a large unwieldy calibration system. In addition, the testing of the output level was not possible due to the limited size of the water tank and the interference caused by reverberation within the tank.

SUMMARY OF THE INVENTION

Accordingly, it is a general purpose and object of the present invention to provide an improved calibration transducer system suitable for exercising the transducer and acoustic panel of a homing torpedo. It is an additional object that the system be an external attachment to a homing torpedo. Additional objects are that the device be durable, low in cost and weight, and be able to generate a variation of types of valid target echoes. These and other objects of the invention and the various features and details of construction and operation will become apparent from the specification and drawing.

This is accomplished in accordance with the present invention by providing an apparatus enclosing a homing system torpedo and calibration transducer system. The two systems are held in physical abutment with each other. The calibration transducer system comprises a plurality of elements located in respective quadrants for providing simulated acoustic signals, including such signals as varying target angles, reverberation and doppler shifted signals. In addition the calibration transducer is capable of measuring the output level of the homing system transducer during the transmit cycle.

BRIEF DESCRIPTION OF THE DRAWINGS

FIG. 1 is a pictorial view of the homing system testing apparatus of the present invention; and FIG. 2 is a block diagram of the electrical components used in conjunction with the apparatus of FIG. 1.

DESCRIPTION OF THE PREFERRED EMBODIMENTS

Referring now to FIG. 1 there is shown a homing system testing apparatus 10. The apparatus 10 includes a base 11 for mounting purposes. A calibration transducer housing 12 and a nose section 14 that has a homing system (not shown) are located in abutment with each other parallel I beams 16 and end plates 18 form an enclosing frame for system 12 and section 14. A pair of end plates 18 are secured to respective ends of beams 16. A pair of supports 15 hold section 14 in a substantially horizontal position and support elements 27 hold housing 12. The calibration transducer 12 includes a Rho-C rubber compound acoustic window 20, a transducer plate 22, a housing component 23 and a back plate 24. A connector 26 is affixed to plate 24 for extending leads from the interior of system 12 through an aperture in plate 24 for test purposes. A pressure distribution block 28 is affixed to the central portion of plate 24. Hydraulic press 30 is secured to respective end plate 18 and exerts an axial force on calibration transducer 12 so that a firm abutment is made by nose section 14 and the Rho-C rubber compound 20 of calibration transducer housing 12. A thin layer of oil is disposed between the nose section 14 and Rho-C compound 20 for more uniform mechanical coupling.

FIG. 2 is a block diagram of an experimental hookup of the calibration transducer utilized for obtaining nulls in the homing system transducer. The block diagram comprises the acoustic window 20 with transducer elements 32, 33, 34 and 35 affixed thereto. The elements 32–35, inclusive, are each arranged in respective quadrants. All other numbered components shown are normally located exterior to housing 12 in FIG. 1. The connections are made through electrical connector 26.

The amplifiers 40, 41, 42 and 43 are connected to respective elements 32–35, inclusive. A variable phase shifter 46 is serially connected to amplifier 41 and element 33. A variable phase shifter 56 is serially connected to amplifier 43 and element 35. A terminal 50 is connected to the output of a variable phase shifter 48 and to the inputs of amplifier 40 and phase shifter 46. A terminal 54 is connected to the inputs of both amplifier 42 and phase shifter 56. A terminal 52 is connected to the input of phase shifter 48 and in addition to terminal 54.

In operation with only elements 32 and 33 hooked up, an input signal is applied to terminal 52. The signal could be sinusoidal or a noise input. Phase shifter 46 is then varied to yield the best null in the horizontal difference windings (not shown) of the homing system transducer located in nose section 14. Homing system transducers are well known to those skilled in the art and need not be further described as they comprise no part of the present invention. Then elements 32 and 33 are disconnected and elements 34 and 35 are hooked up and the same alignment is repeated using phase shifter 56. Following this all elements 32, 33, 34 and 35 are hooked up and phase shifter 46 is varied to obtain the best null in the vertical difference windings (not shown) of the homing system transducer. Such an adjustment provides deep simultaneous nulls in both the horizontal and vertical difference channels of the homing system transducer. In addition, with such an adjustment, the phases and amplitudes of the output signals from each element 32, 33, 34 and 35 are nearly equal and correspond to the head-on target position. Varying the phase of any channel will disturb this balance and will correspond to a certain target angle. Adjusting the phases of two channels simultaneously allows the generation of any target angle.

A transmit level detector 60 which could be an oscilloscope or four parallel peak followers with digital readout is connected between amplifiers 40, 41, 42 and 43 and respective elements 32, 33, 34 and 35. The transmit level detector 60 measures the output level of the homing system transducer when the homing system is on transmit cycle. The acoustic signals from the homing system are picked up by the elements 32–35, inclusive, and displayed by the transmit level detector 60.

There has therefore been described a calibration transducer system for providing target signals at changing target angles and amplitudes. Examples of such signals include reverberation, ambient noise and doppler. The above described calibration transducer while clamped to the homing system transducer in the above described manner provides highly repeatable results and is in addition smaller and easier to use than previous systems. Furthermore the inventive system is less prone to contamination which aids in its reliability. In addition it appears feasible to provide a complete exercise of any of the homing functions from search to end of run by use of a computerized signal generator.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A structure for use in testing a homing system in the nose section of a torpedo comprising:
    enclosing means adapted for holding and enclosing said nose section so that the axis of said nose section lies in a horizontal plane;
    a transducer assembly held and enclosed in said enclosing means and adapted to be held in firm abutment to said nose section, said transducer assembly includes a transducer housing enclosing a transducer plate having a plurality of transducer elements arranged in quadrature on said plate and said transducer assembly having an axis coinciding with the perpendicular axis of symmetry of said plate, said axis of said plate and said assembly lying in a horizontal plane;
    horizontal force means for exerting force in a horizontal direction adapted for holding said transducer housing in firm abutment with said nose section; and
    a liquid lubicant disposed on said transducer housing.

2. A structure according to claim 1 wherein said enclosing means further comprises:
    a pair of end plates; and
    a plurality of rods connected between said end plates.

3. A structure according to claim 2 further comprising:
    an electrical connector mounted on said transducer housing; and
    said means for exerting force in a horizontal direction comprising an hydraulic press.

* * * * *